United States Patent
Williams et al.

(10) Patent No.: US 7,104,545 B2
(45) Date of Patent: Sep. 12, 2006

(54) METHOD OF FORMING A GASKET ASSEMBLY FOR A PEM FUEL CELL ASSEMBLY

(75) Inventors: Arthur R. Williams, Spencerport, NY (US); Gary J. DeAngelis, Spencerport, NY (US); Allan R. Wells, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 256 days.

(21) Appl. No.: 10/369,290

(22) Filed: Feb. 18, 2003

(65) Prior Publication Data
US 2004/0160019 A1   Aug. 19, 2004

(51) Int. Cl.
*H01M 2/08* (2006.01)

(52) U.S. Cl. .................. 277/637; 429/35; 429/36; 429/38

(58) Field of Classification Search ........... 277/628, 277/609, 630, 637; 429/35, 36, 38
See application file for complete search history.

(56) References Cited

U.S. PATENT DOCUMENTS

| | | | | |
|---|---|---|---|---|
| 811,000 | A * | 1/1906 | Tompkins | 277/609 |
| 3,526,548 | A * | 9/1970 | Hespel et al. | 126/86 |
| 4,159,367 | A * | 6/1979 | Berchielli et al. | 429/38 |
| 5,534,362 | A * | 7/1996 | Okamoto et al. | 429/32 |
| 6,057,054 | A * | 5/2000 | Barton et al. | 429/42 |
| 6,231,053 | B1 * | 5/2001 | Wakamatsu | 277/628 |
| 6,260,854 | B1 * | 7/2001 | Lemon | 277/609 |
| 6,321,145 | B1 | 11/2001 | Rajashekara | |
| 6,338,492 | B1 * | 1/2002 | Schilling et al. | 277/630 |
| 6,423,896 | B1 | 7/2002 | Keegan | |
| 6,455,185 | B1 | 9/2002 | Bircann et al. | |
| 6,485,852 | B1 | 11/2002 | Miller et al. | |
| 6,509,113 | B1 | 1/2003 | Keegan | |
| 6,551,734 | B1 | 4/2003 | Simpkins et al. | |
| 6,562,496 | B1 | 5/2003 | Faville et al. | |
| 6,596,427 | B1 * | 7/2003 | Wozniczka et al. | 429/32 |
| 6,599,653 | B1 * | 7/2003 | Cummins et al. | 429/35 |
| 6,608,463 | B1 | 8/2003 | Kelly et al. | |
| 6,610,435 | B1 * | 8/2003 | Maruyama et al. | 429/34 |
| 6,613,468 | B1 | 9/2003 | Simpkins et al. | |
| 6,613,469 | B1 | 9/2003 | Keegan | |
| 6,627,339 | B1 | 9/2003 | Haltiner, Jr. | |
| 6,630,264 | B1 | 10/2003 | Haltiner, Jr. et al. | |
| 6,649,097 | B1 * | 11/2003 | Sasaki et al. | 264/102 |

(Continued)

FOREIGN PATENT DOCUMENTS

EP   1 220 345   7/2002

(Continued)

*Primary Examiner*—Alison K. Pickard
(74) *Attorney, Agent, or Firm*—Paul L. Marshall

(57) ABSTRACT

A thermoplastic carrier sheet is die-cut to have a size and shape matching that of a PEM bipolar plate. A plurality of holes are punched in the carrier sheet in the pattern of gasket beading to be formed subsequently. In a mold, liquid gasket resin fills the mold on both sides of the carrier sheet to form the gasket, flowing through the holes in the sheet and thereby causing the gasket to become mechanically attached to the sheet. A carrier element having a flange portion substantially identical with the outer profile of the bipolar plates is laminated to the sheet edge. During assembly of a fuel cell, the carrier element automatically positions the gasket correctly on the plate and prevents the gasket from twisting or shifting. In a currently preferred embodiment, a membrane electrode assembly is attached within an appropriate opening in the carrier sheet.

4 Claims, 3 Drawing Sheets

U.S. PATENT DOCUMENTS

| | | | |
|---|---|---|---|
| 6,720,103 B1 * | 4/2004 | Nagai | 429/36 |
| 6,790,552 B1 * | 9/2004 | Kobayashi et al. | 429/30 |
| 6,805,986 B1 * | 10/2004 | Kuroki | 429/22 |
| 6,840,969 B1 * | 1/2005 | Kobayashi et al. | 29/623.2 |
| 6,861,171 B1 * | 3/2005 | Suzuki | 429/34 |
| 6,933,070 B1 * | 8/2005 | Kusakabe et al. | 429/34 |
| 2004/0214067 A1 * | 10/2004 | Boyer et al. | 429/34 |

FOREIGN PATENT DOCUMENTS

| | | |
|---|---|---|
| EP | 1 223 629 | 7/2002 |
| WO | 02/089240 | 11/2002 |

* cited by examiner

METHOD OF FORMING A GASKET ASSEMBLY FOR A PEM FUEL CELL ASSEMBLY

TECHNICAL FIELD

The present invention relates to proton-exchange membrane (PEM) fuel cells; more particularly, to gasketing for a PEM fuel cell; and most particularly, to an improved process for forming and using an elastomeric gasket to seal the edges of bipolar plates in a PEM fuel cell assembly.

BACKGROUND OF THE INVENTION

Proton-exchange membrane fuel cells are well known. In a PEM fuel cell, hydrogen atoms are ionized in an anode, migrate through a specialized membrane as hydrogen cations (protons), and combine with oxygen anions at a cathode to form water. Electrons from the hydrogen flow from the anode through an external circuit to the cathode, performing work in between. The membrane, typically with a catalyst coating sandwiched between layers of gas diffusion media (GDL), is know in the art as a membrane electrode assembly (MEA). A bipolar plate assembly is constructed by joining an individual anode and cathode plate.

Fuel cell assemblies comprise a plurality of individual bipolar plate assemblies stacked together and connected in electrical series. When the MEA is captured between the anode and cathode they form an individual cell whereby the electrochemical reaction can take place. Such bipolar plates, when stacked together with the MEAs in between, form a fuel cell assembly. Openings through the bipolar plates near the edges form headers for inlet and exhaust of fuel and combustion gases as well as coolant. Other openings may be provided for alignment during assembly or for other specialized purposes.

Bipolar plates typically are formed of a metals (such as titanium or stainless steel) or composites (such as a thermoset graphite-loaded vinyl ester polymer) and are easily damaged by twisting or other application of uneven stresses. The plates require a non-conductive seal or gasket along all outer edges and around all openings to prevent leaking of reactant gases and coolant and to electrically insulate the bipolar plates from each other. It is known to use separate die-cut or molded elastomeric gaskets, installed between the plates during assembly of a fuel cell stack.

A problem exists in locating the gaskets properly with respect to the openings to be sealed. Further, individual gaskets are thin, very pliable, and thus are easily twisted and deformed. A misaligned or twisted gasket can cause leaks, broken bipolar plates, and stack failure.

What is needed is a reliable method of forming and installing resilient gaskets in assembly of a fuel cell stack.

It is a principal object of the present invention to improve the reliability of assembly of a fuel cell stack.

It is a further object of the invention to reduce waste and cost in fuel cell manufacture.

It is a still further object of the invention to improve ease of assembly of a fuel cell stack.

SUMMARY OF THE INVENTION

Briefly described, in a method of forming a gasket assembly for a fuel cell assembly, a thermoplastic carrier sheet is die-cut to have a size and shape matching that of a bipolar plate, including various cutouts known in the art for passage of reactant gases, spent gases, coolant, and placement of a membrane electrode assembly. A plurality of holes are also punched in the carrier sheet in the pattern of gasket beading to be formed subsequently. In a gasket mold, liquid gasket material fills the mold on both sides of the carrier sheet to form gasket elements on both sides, flowing through the holes in the sheet and thereby causing the gasket elements to become mechanically attached to the sheet and to each other. Different liquid gasket materials can be used to suit the performance demands of the local environment. Preferably, a pre-molded plastic carrier element having a flange portion substantially identical with the outer profile of the bipolar plate is then overmolded onto the sheet. Alternately, locator features are provided in the outer regions of the sheet to aid in accurately locating the gasket elements.

During assembly of a fuel cell assembly, the plastic carrier element fits over a bipolar plate, automatically positioning the gasket correctly on the plate. The carrier sheet prevents the gasket from twisting or shifting. In a currently preferred embodiment, a membrane electrode assembly is attached as by ultrasonic welding within an appropriate opening in the carrier sheet.

A gasket assembly in accordance with the invention provides the following benefits over prior art gasketing schemes:

Eliminates need for bonding a gasket to a bipolar plate.

Prevents twisting, stretching, and rolling of a gasket.

Aligns the gasket to a bipolar plate so that the gasket is placed correctly in a gasket groove therein.

Aligns adjacent bipolar plates, greatly simplifying stack assembly.

Provides a positive stop, limiting compression of the gasket during assembly.

Provides electrical isolation of the bipolar plates.

Simplifies installation of membrane electrode assemblies during stack assembly.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
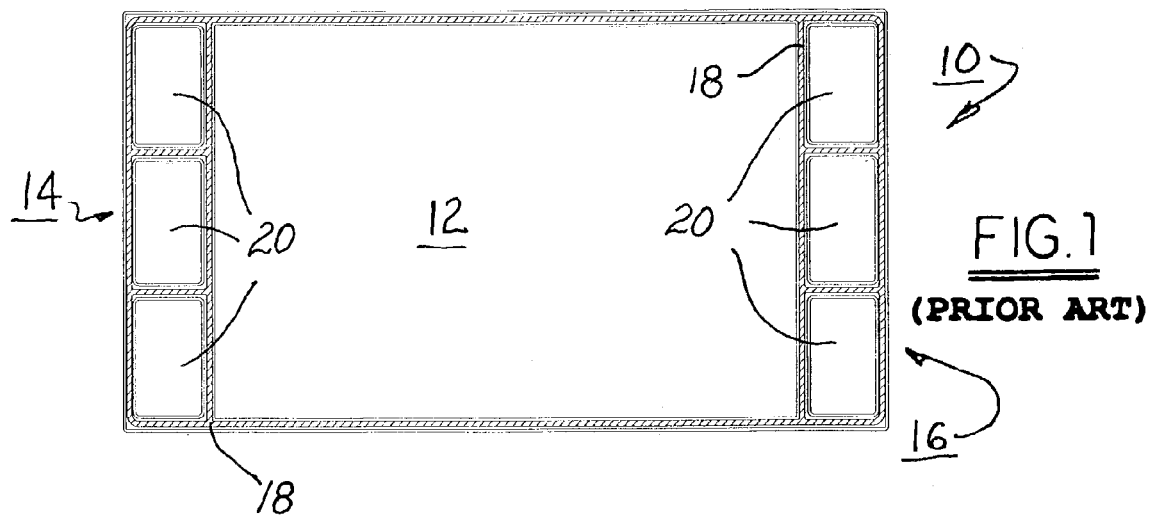
FIG. 1 is a top view of a bipolar plate having a loose or applied perimeter gasket in accordance with the prior art.

Referring to FIG. 1, a typical bipolar plate 10 for use in a PEM fuel cell is generally rectangular, having a central region 12 for receiving fuel cell electrodes and membrane (not shown) and first and second manifold regions 14,16 for providing fuel, air and coolant to the central region in known fashion. Plate 10 is provided with a prior art resilient gasket 18 (shown as a hatched section in FIG. 1) which surrounds central region 12 and one or more of the apertures 20 in manifold regions 14 and 16. Gasket 18 typically is formed either as an independent, flexible element or as a cast laminate on the surface of plate 10.

Figure 2:
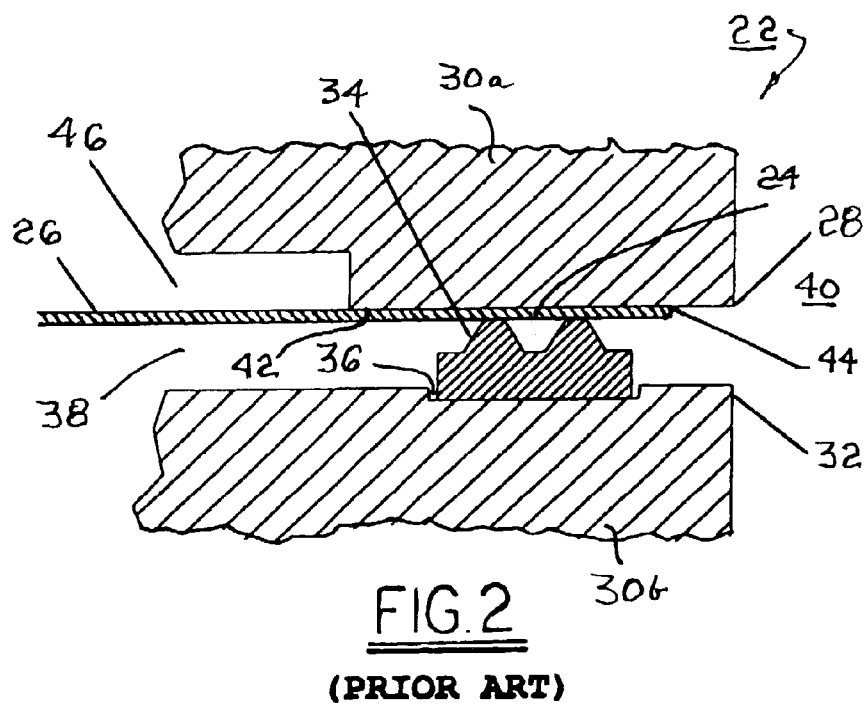
FIG. 2 is a detailed cross-sectional view of a region of a PEM fuel cell stack, including the prior art gasket shown in FIG. 1.

Referring to FIG. 2, in a typical prior art PEM fuel cell 22, an edge portion 24 of a membrane electrode assembly 26 extends between the cathode side 28 of a first bipolar plate 30a and the anode side 32 of a typically identical second bipolar plate 30b. An elastomeric gasket 34 is disposed on anode side 32, typically in a shallow channel 36, to seal against MEA 26 to prevent leakage of gas from first flow chamber 38 to the exterior 40 of the fuel cell. MEA 26 itself forms an integral seal against surface 42 of cathode side 28, which seal is known to permit leakage 44 of gas from second flow chamber 46 under some circumstances, especially at first usage of the fuel cell before the membrane becomes hydrated by exhaust water.

Figure 3:
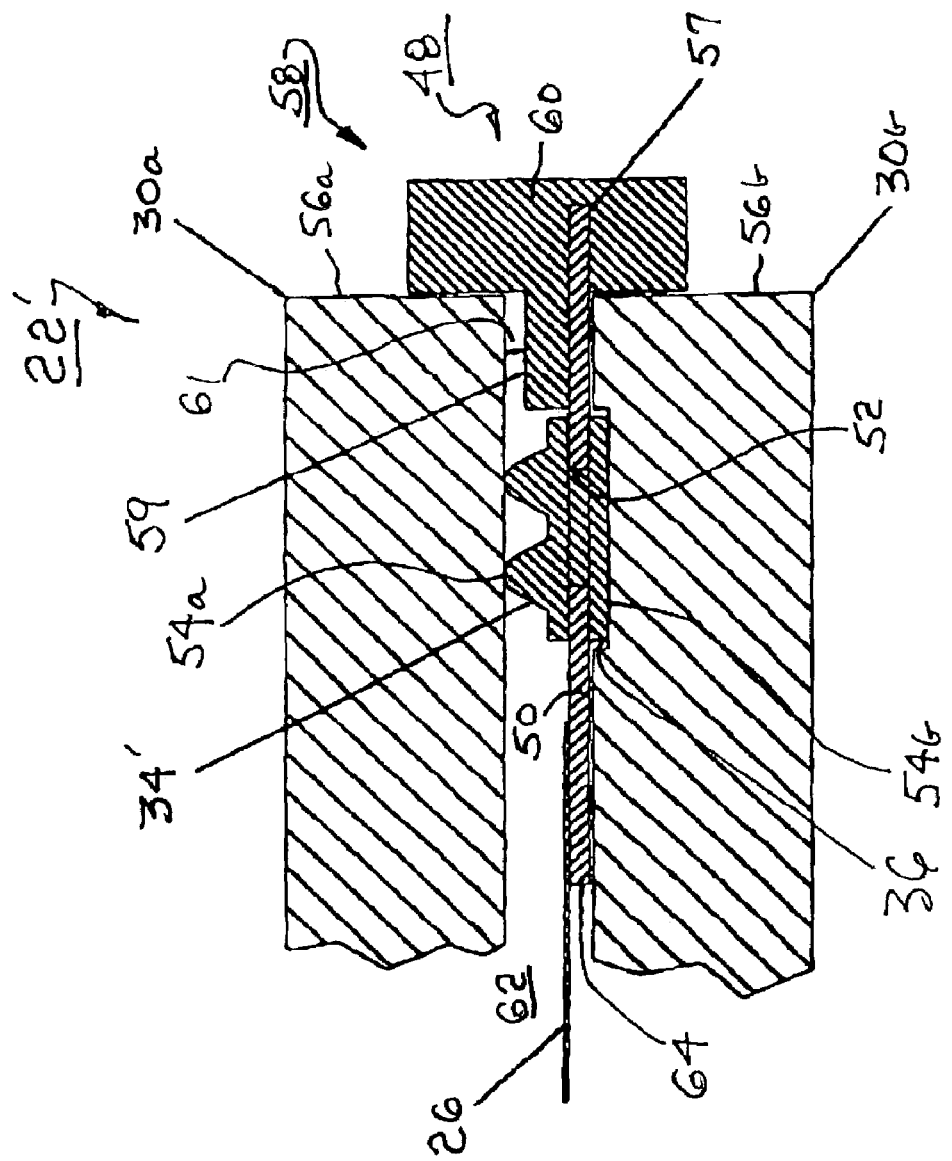
FIG. 3 is a detailed cross-sectional view of a region of a PEM fuel cell stack, including a gasket in accordance with the present invention.

Referring to FIG. 3, an improved PEM fuel cell 22' includes an improved gasket assembly 48 in accordance with the invention. Plastic carrier sheet 50 is formed, preferably by die-cutting, in the general shape of bipolar plate 10 shown in FIG. 1, corresponding to plates 30a,30b in FIGS. 2 and 3. In areas of sheet 50 intended for gasket support, a plurality of holes 52 are punched along the line of the intended gasket 34'. Gasket 34' includes first and second gasket elements 54a,54b on opposite sides of sheet 50 and connected through holes 52. Preferably, sheet 50 extends 57 beyond the edges 56a,56b of bipolar plates 30a,30b to be joined with a pre-molded plastic carrier element 58 having a flange portion 60 having a profile substantially coincident with edges 56a,56b. Preferably, sheet 50 is cut out in the reactive area 62 of the fuel cell assembly and along its inner edge 64 is supportive of a membrane electrode assembly 26.

In a method for forming improved gasket assembly 48, a carrier sheet 50 is formed, preferably by die-cutting, from plastic film stock, for example, polyethylene terephthalate (PET), such as Mylar® preferably between between 3 and 14 mils thick. Carrier sheet 50 may have inner edges 64, edge extension 57 and a plurality of holes 52 as described above. Carrier sheet 50 is inserted (insertion molding) into an appropriate liquid injection female mold formed in the shape of the desired gasket elements 54a,54b. An elastomer compound, preferably a liquid silicone rubber such as (LSR), is injected into the mold to form the gasket elements and to connect them through holes 52. Thus the positions of the gasket elements are firmly fixed with respect to each other and to the carrier sheet 50. In an alternate embodiment, different elastomer compounds can be selectively used to form various parts of the gasket elements, as best suited for the local environment. For example, a compound can be used in forming the gasket element around a coolant manifold region because of its compatibility with the coolant.

In an additional step, carrier element 58 is formed as by injection molding of a durable polymer such as nylon and is attached to edge extension 57 of sheet 50 to form a gasket assembly which is readily mounted onto bipolar plate 30b, which readily and accurately positions plate 30a with respect to plate 30b, and which readily and accurately positions gasket 34' in gasket channel 36. Preferably, carrier element 58 includes a spacer portion 59 extending inwards along said carrier sheet. Portion 59 is formed having a predetermined thickness for limiting the compression distance 61 of gasket element 54a during assembly of fuel cell 22'.

In a currently-preferred additional step, MEA 26 is joined as by ultrasonic or laser welding to sheet 50 inboard of inner edge 64, thus simplifying the installation of the MEA in the fuel cell assembly.

Figure 4:
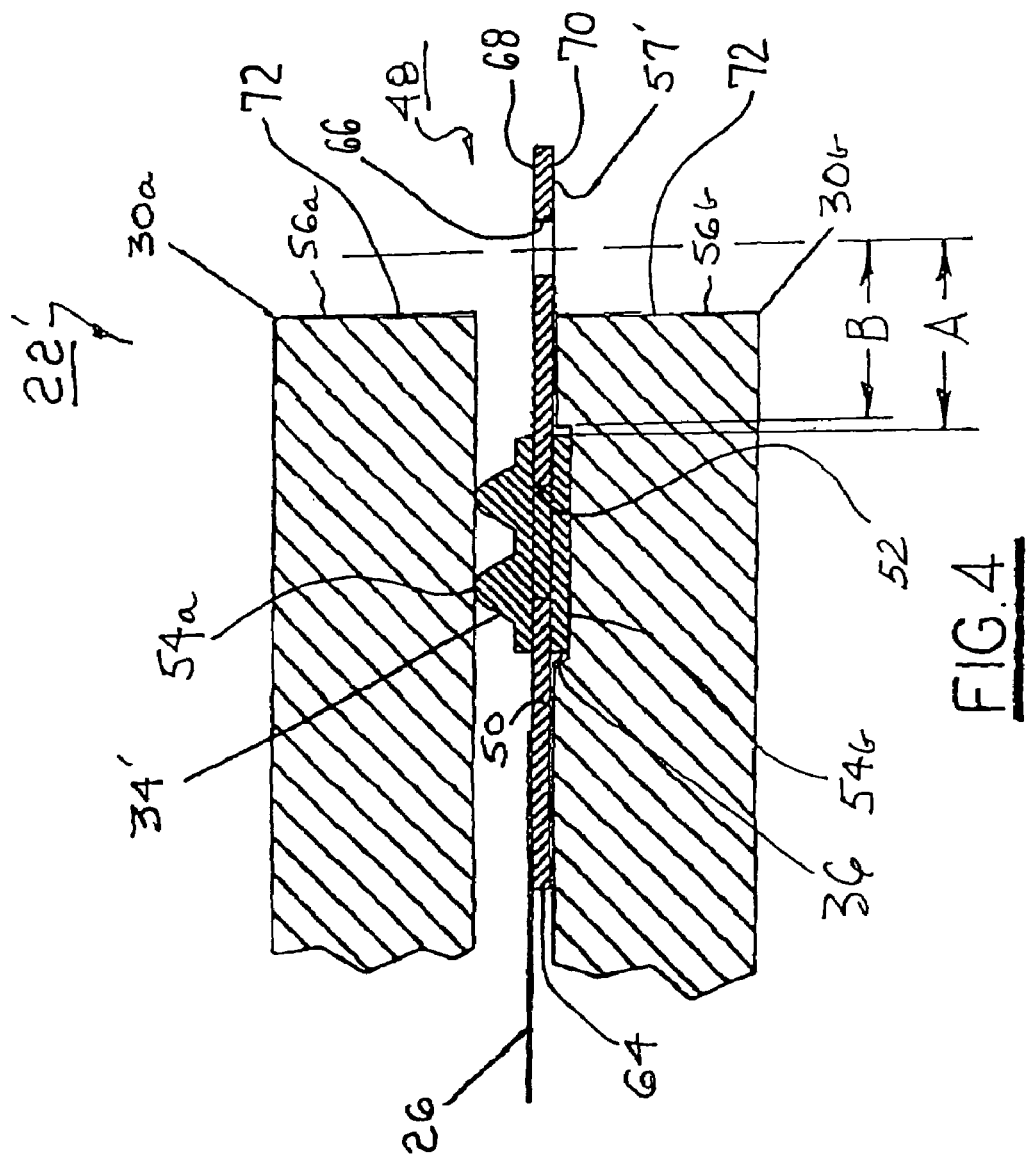
FIG. 4 is a section of a region of PEM fuel cell stack, similar to that shown in FIG. 3, showing locator features.

In yet another embodiment, edge extension 57' of sheet 50 (FIG. 4) includes one or more locator features 66, extending from top surface 68 of sheet 50 to bottom surface 70 of sheet 50. Features 66 can take the form of, for example, a notch or orifice. Using locator features 66 as an index, gasket elements 54a,54b can be precisely positioned (dimension A) relative to locator features 66 when molded to carrier sheet 50. Then, using locator features 66 as an index relative to end surfaces 72 of plates 30a,30b, gasket 34 can be accurately positioned (dimension B) in gasket channel 36 during assembly.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A proton exchange fuel cell assembly comprising a first bipolar plate, a second bipolar plate, and a gasket assembly including
    a carrier sheet in a general shape of at least one of said first and second bipolar plates, said carrier sheet having a plurality of holes formed in one or more regions of said sheet, said carrier sheet including an edge extension that extends beyond an edge of at least one of said first and second bipolar plates of said proton exchange fuel cell assembly, and
    one or more gasket elements extending away from at least one surface of said carrier sheet and extending into at least one of said holes in said sheet, and
    a carrier element coupled with said edge extension, said carrier element including a spacer portion that extends inwards along said carrier sheet and is positioned between said first and second bipolar plates to limit a compression distance of said gasket element.

2. A proton exchange fuel cell assembly in accordance with claim 1 wherein said carrier element includes a flange portion having a profile substantially coincident with said edge of at least one of said first and second bipolar plates.

3. A proton exchange fuel cell assembly comprising:
    first and second bipolar plates;
    a carrier sheet in a general shape of at least one of said first and second bipolar plates, said carrier sheet positioned between said first and second bipolar plates, said carrier sheet having a plurality of holes formed in one or more regions of said sheet, said carrier sheet including an edge extension that extends beyond an edge of at least one of said first and second bipolar plates,
    a membrane electrode assembly coupled with said carrier sheet;
    one or more gasket elements extending away from at least one surface of said carrier sheet and extending into at least one of said holes in said sheet, and
    a carrier element coupled with said edge extension, said carrier element including a spacer portion that extends inwards along said carrier sheet and is positioned between said first and second bipolar plates to limit a compression distance of said gasket element.

4. A proton exchange fuel cell assembly in accordance with claim 3 wherein said carrier element includes a flange portion having a profile substantially coincident with said edge of at least one of said first and second bipolar plates so that said flange portion is positioned adjacent to said edge of at least one of said first and second bipolar plates.

* * * * *